United States Patent
Koon et al.

(10) Patent No.: US 10,560,511 B2
(45) Date of Patent: *Feb. 11, 2020

(54) ADAPTIVE TILE FRAMEWORK (71) Applicant: SUCCESSFACTORS, INC., So. San Francisco, CA (US)

(72) Inventors: Derrick Koon, So. San Francisco, CA (US); Michael Dandan, So. San Francisco, CA (US); Ingrid Bernaudin, So. San Francisco, CA (US); Zhaojian Dou, So. San Francisco, CA (US)

(73) Assignee: Success Factors, Inc., South San Francisco, CA (US)

( * ) Notice: Subject to any disclaimer, the term of this patent is extended or adjusted under 35 U.S.C. 154(b) by 211 days.

This patent is subject to a terminal disclaimer.

(21) Appl. No.: 15/721,513

(22) Filed: Sep. 29, 2017

(65) Prior Publication Data
US 2018/0027047 A1 Jan. 25, 2018

Related U.S. Application Data (63) Continuation of application No. 13/918,691, filed on Jun. 14, 2013, now Pat. No. 9,807,145.

(60) Provisional application No. 61/822,231, filed on May 10, 2013.

(51) Int. Cl.
H04L 29/08 (2006.01)
G06F 16/957 (2019.01)
H04W 4/20 (2018.01)
G06F 3/0481 (2013.01)

(52) U.S. Cl.
CPC ........ *H04L 67/025* (2013.01); *G06F 16/9577* (2019.01); *H04W 4/20* (2013.01); *G06F 3/0481* (2013.01); *H04L 67/36* (2013.01)

(58) Field of Classification Search
CPC ............. G06F 3/0481; G06F 17/30905; G06F 17/30873; G06F 16/9577; H04L 67/2838; H04L 67/02; H04L 67/025; H04L 67/36; H04W 4/20

See application file for complete search history.

(56) References Cited

U.S. PATENT DOCUMENTS

| | | | |
|---|---|---|---|
| 6,353,448 B1 | 3/2002 | Scarborough et al. |
| 6,789,054 B1 | 9/2004 | Makhlouf |
| 7,022,075 B2 | 4/2006 | Grunwald et al. |
| 7,136,874 B2 | 11/2006 | Mercer et al. |

(Continued)

OTHER PUBLICATIONS

Extended European Search Report dated Sep. 22, 2014 in related European Patent Application No. 14001664.3; 5 pages.

*Primary Examiner* — Kieu D Vu
*Assistant Examiner* — Blaine T. Basom
(74) *Attorney, Agent, or Firm* — Fountainhead Law Group P.C.

(57) ABSTRACT

The present disclosure includes an adaptive tile framework. In one embodiment, a method is disclosed comprising sending an access request from a mobile application operating on a mobile device to one or more remote systems, receiving a plurality of interactive features available on the remote systems, associating the plurality interactive features with a plurality of tiles, where particular interactive features are associated with particular tiles, and where the tiles are user interface elements for interfacing with one or more specific interactive features of the remote systems, and displaying the tiles.

20 Claims, 11 Drawing Sheets

(56) References Cited

U.S. PATENT DOCUMENTS

| | | |
|---|---|---|
| 7,360,170 B1 | 4/2008 | Giormov et al. |
| 7,475,089 B1* | 1/2009 | Geddes .............. G06F 16/958 |
| 7,577,907 B2 | 8/2009 | Vishnia-Shabtai et al. |
| 7,577,912 B2 | 8/2009 | Govindan et al. |
| 7,689,923 B2 | 3/2010 | Massasso et al. |
| 7,831,931 B2 | 11/2010 | Klein et al. |
| 7,925,985 B2 | 4/2011 | Moore |
| 7,933,632 B2 | 4/2011 | Flynt et al. |
| 7,949,953 B2 | 5/2011 | Bhatt et al. |
| 8,015,506 B2 | 9/2011 | Fleishman et al. |
| 8,078,633 B2 | 12/2011 | Elbaz et al. |
| 8,126,984 B2 | 2/2012 | Vogler et al. |
| 8,146,016 B2 | 3/2012 | Himberger et al. |
| 8,370,887 B2 | 2/2013 | Virdi et al. |
| 8,392,664 B2 | 3/2013 | Comparan et al. |
| 8,423,911 B2 | 4/2013 | Chaudhri |
| 8,589,311 B2 | 11/2013 | Bhatt et al. |
| 2004/0205555 A1* | 10/2004 | Hind ....................... H04L 67/02 715/205 |
| 2006/0010390 A1* | 1/2006 | Guido .................... G06F 16/954 715/742 |
| 2006/0235935 A1 | 10/2006 | Ng |
| 2008/0046825 A1* | 2/2008 | Bedi ...................... G06Q 30/02 715/742 |
| 2009/0132942 A1 | 5/2009 | Santoro et al. |
| 2009/0178005 A1* | 7/2009 | Jheng .................... G06F 3/0482 715/825 |
| 2009/0265634 A1 | 10/2009 | Beringer et al. |
| 2011/0004827 A1 | 1/2011 | Doerr et al. |
| 2012/0130521 A1 | 5/2012 | Kohlhoff |
| 2012/0198368 A1 | 8/2012 | Bornheimer et al. |
| 2012/0266100 A1 | 10/2012 | Caliendo et al. |
| 2013/0067412 A1 | 3/2013 | Leonard et al. |
| 2013/0097528 A1 | 4/2013 | Armitage |
| 2013/0120380 A1 | 5/2013 | Kallio et al. |
| 2014/0040817 A1 | 2/2014 | Sakamoto |
| 2014/0189592 A1 | 7/2014 | Benchenaa et al. |
| 2014/0337747 A1 | 11/2014 | Koon et al. |

\* cited by examiner

ADAPTIVE TILE FRAMEWORK

CROSS REFERENCE TO RELATED APPLICATIONS

The present disclosure is a continuation of and claims priority to U.S. patent application Ser. No. 13/918,691 filed Jun. 14, 2013, which is a non-provisional of and claims priority to U.S. Provisional Patent App. No. 61/822,231 filed May 10, 2013. U.S. patent application Ser. No. 13/918,691 filed Jun. 14, 2013 and U.S. Provisional Patent App. No. 61/822,231 filed May 10, 2013 are both hereby incorporated herein by reference in their entirety for all purposes.

BACKGROUND

The present invention relates to computing and data processing, and in particular, to an adaptive tile framework.

The growth of mobile computing has placed nearly unlimited amounts of information in the hands of users. As the processing power of handheld devices continues to increase, and as the speed of wireless networks continues to accelerate, mobile device users are faced with the growing challenge of managing and organizing their computing resources.

Traditionally, the presentation of information on a mobile device has focused on static consumption. Many mobile applications present users with articles, music, and messages for consumption. Yet, as network connectivity increases, more resources traditionally found on a desktop system are becoming available on mobile devices. While this stands to create many opportunities, it has also created many challenges.

For example, there are many paradigm shifts that make mobile devices a challenging environment to work in. In contrast to traditional desktop systems, where a user may have constant access to a full keyboard, mouse, and possibly multiple large displays, the interface on many mobile devices is often much more constrained. Interface efficiency is often a critical requirement of a mobile device.

Additionally, network connectivity is another distinction between mobile devices and traditional desktop systems. In a desktop system, a computer is often connected directly to a network, which in turn, may be connected via high speed connections and standard protocols to backend servers or the Internet. However, accessing complex functionality that may reside on an external system using a mobile device is challenging because in many cases intermediate, and sometimes intermittent, networks and unique gateways are required to access typical backend systems. Further, given limited interface space available on many mobile devices, accessing feature rich backend services can be a significant challenge.

SUMMARY

The present disclosure includes an adaptive tile framework. In one embodiment, a method is disclosed comprising sending an access request from a mobile application operating on a mobile device to one or more remote systems, receiving a plurality of interactive features available on the remote systems, associating the plurality interactive features with a plurality of tiles, where particular interactive features are associated with particular tiles, and where the tiles are user interface elements for interfacing with one or more specific interactive features of the remote systems, and displaying the tiles. The method accesses the plurality of interactive features on the remote systems through the associated plurality of tiles.

The following detailed description and accompanying drawings provide a better understanding of the nature and advantages of the present disclosure.

DETAILED DESCRIPTION

Described herein are techniques for an adaptive tile framework. The apparatuses, methods, and techniques described below may be implemented as a computer program (software) executing on one or more computers. The computer program may further be stored on a tangible non-transitory computer readable medium, such as a memory or disk, for example. A computer readable medium may include instructions for performing the processes described below. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
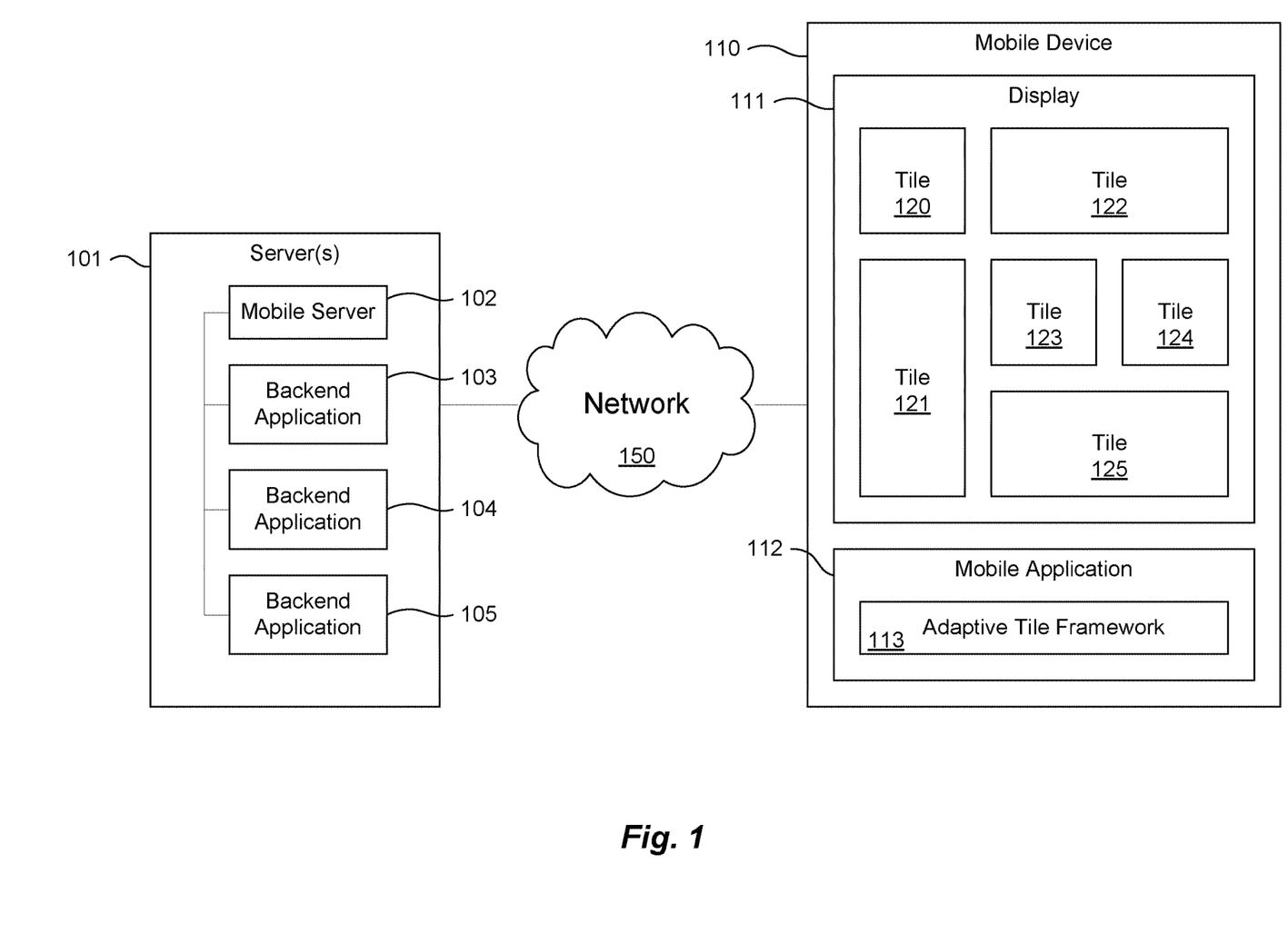
FIG. 1 illustrates an adaptive tile framework according to one embodiment.

FIG. 1 illustrates a mobile device operating a mobile application according to one embodiment. As illustrated in FIG. 1, a mobile computing device 110 (or just, "mobile device") executes a mobile application 112. Mobile device 110 may be a mobile phone, such as a smartphone, or a tablet computer, for example. Such mobile devices may include one or more processors and memory for storing instructions to perform a wide variety of features and functions, including the features described herein. Mobile device 110 may connect to other remote systems such as one or more servers 101 over a network 150, for example. Network 150 is illustrative of one or more networks for communicating information with other computer systems, such as a cellular communication system, an Ethernet network, the Internet, or a wireless network, for example. Mobile application 112 executing on mobile device 110 may receive and send data from one or more remote systems or from a user via a user interface including display 111, for example. In this example, mobile application 112 may communicate with a mobile server 102. Mobile server 102, in turn, may act as an interface between mobile application 112 and backend applications 103-105.

As described in more detail below, mobile application 112 may include an adaptive tile framework 113 to display tiles 120-125. Tiles 120-125 may be displayed as a two-dimensional array having rows and columns of tiles. In this example, the array has 3 rows and 3 columns. Tiles are user interface elements, and in particular embodiments described herein, may be used for interfacing with one or more specific interactive features of the remote systems, such as backend applications 103-105. In particular implementations, tiles may be individual and independent user interfaces arranged on a scrollable user interface field for presentation to a user in display 111. As illustrated in display 111, different tiles may occupy one or more rows and one or more columns in the two-dimensional array. The example tiles in FIG. 1 are squares and rectangles. For example, tile 120 has an aspect ratio of 1×1 (i.e., a width×height of 1 column and 1 row), and occupies one space in the array. Similarly, tiles 123 and 124 have aspect ratios of 1×1 and occupy one space each in the array. Some of the tiles occupy more than one row or more than one column. For instance, tile 121 has an aspect ratio of 1×2 (i.e., 1 column and 2 rows) and occupies 2 spaces across two rows in the array. Similarly, tiles 122 and 125 have aspect ratios of 2×1 (i.e., 2 columns and 1 row) and occupy 2 spaces across two columns in the array. Other embodiments may use squares and rectangles having a variety of other aspect ratios (width and height) or other shapes arranged on a grid.

Figure 2:
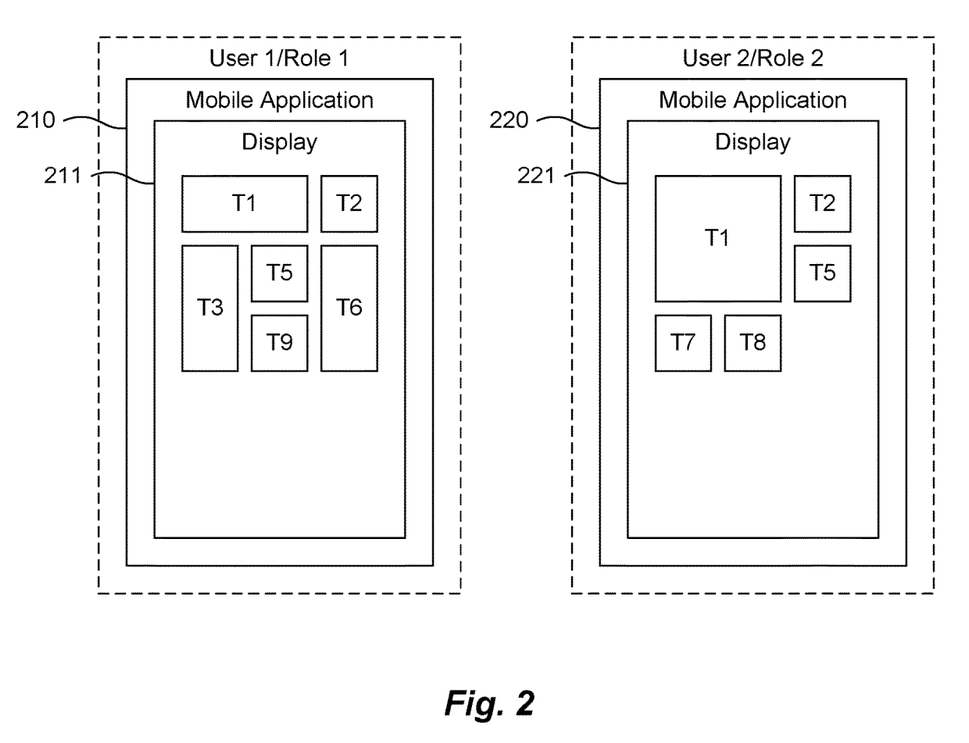
FIG. 2 illustrates automatic configuration of tiles on a display according to one embodiment.

Adaptive tile framework 113 may present interactive features from backend applications 103-105 in different tiles. In one embodiment, tiles may automatically be configured on display 111. Further, in some embodiments interactive features available on backend applications may be accessed based on a role of a user associated with tiles displayed on a mobile application, for example. FIG. 2 illustrates automatic configuration of tiles on a display according to one embodiment. In this example, different displays may present different tiles based on the particular user and role. For example, display 211 on mobile application 210 may be associated with a first user and display 221 on mobile application 220 may be associated with a second user. Each user may have a particular role within an organization, such as an HR facilitator, product line director, Vice President of Marketing, or Finance Manager, for example. When the mobile applications connect to a backed server, such as an enterprise software application, the mobile applications may be authorized (e.g., using single sign on, "SSO") and the user's roles may be determined. Different users may have access to different backend features based on their roles in an organization, for example. Accordingly, one user (User 1 in Role 1) may be presented with one set of tiles that are associated with particular backend interactive services (T1, T2, T3, T5, T6, and T9), and another user (User 2 in Role 2) may be presented with another set of tiles that are associated with particular backend interactive services (T1, T2, T5, T7, and T8). Embodiments of the disclosure described below may automatically reconfigure available tiles for display, such that tile sizes or tile placements, or both, for each tile are determined automatically. For example, tile size and tile placement may be based on a number of tiles to be displayed, the size of the tiles, tile display preferences, or based on the interactive features associated with each tile, or all of these. Accordingly, the mobile application may automatically display different tiles having different interactive features and different sizes for different mobile application users having different roles as illustrated in FIG. 2.

Additionally, some embodiments may display tiles so that not more than one row of a two-dimensional array in the display is partially filled with tiles. Additionally, a partially filled row may be displayed below rows that are entirely filled with tiles. As illustrated in FIG. 2, all three rows of the 3×3 grid in display 211 are entirely filled. In display 221, the first two rows are entirely filled, and the partially filled row, comprising tiles T7 and T8, is below the entirely filled rows.

Figure 3A:
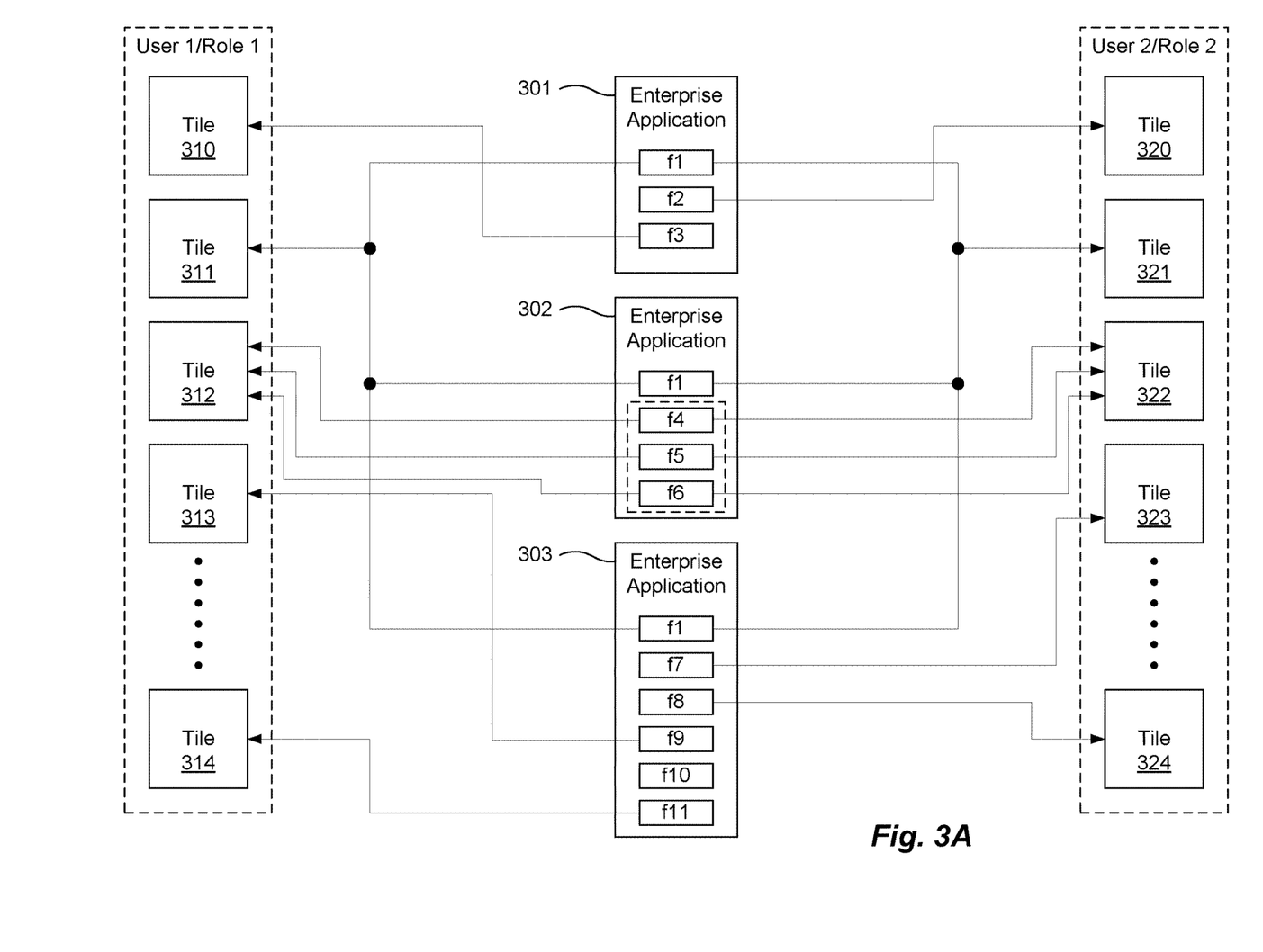
FIG. 3A illustrates tiles associated with interactive features of different enterprise applications according to one embodiment.

FIG. 3A illustrates tiles associated with interactive features of different enterprise applications according to one embodiment. In this example, enterprise applications 301-301 each include a variety of features that may be accessible by tiles on a mobile device. Example interactive features include ToDo lists, Analytics, Notifications, or Newsfeeds. Enterprise applications may be human resource software applications, enterprise resource planning applications, or any of a wide variety of backend software systems, for example. Mobile devices may communicate with enterprise applications 301-303 through a mobile server (not shown). Enterprise application 301 may include interactive features f1, f2, and f3 that are accessible to tiles on a mobile application. A user's role may be determined and communicated across enterprise applications 301-303, and particular interactive features may be presented for display in associated tiles. For example, based on Role 1, interactive feature f3 may be presented and accessed through tile 310. Some interactive features, such as a ToDo list, may be included on multiple systems. Accordingly, a particular tile may be associated with interactive features on multiple different systems, such as tile 311 and feature f1 on enterprise applications 301, 302, and 303, for example. In some cases, core functionality of an application server may be associated with a particular tile. For instance, enterprise application 302 may include core features f4, f5, and f6, which may be associated with a single tile 312, for example. In other cases, different features of a particular enterprise application may be associated with different tiles, such as feature f9, which is associated with tile 313 based on Role 1, and feature f11, which is associated with tile 314 based on Role 1.

As illustrated in FIG. 3A, a different user role may result in different tiles being associated with different backend features. In this example, based on User 2 having Role 2, tile 320 is associated with feature f2 in application 301, tile 321 is associated with feature f1 on applications 301-303 (e.g., a ToDo feature), tile 322 is associated with core application features f4, f5, and f6 on application 302, tile 323 is associated with feature f7 on application 303, and tile 324 is associated with feature f8 on application 303.

Figure 3B:
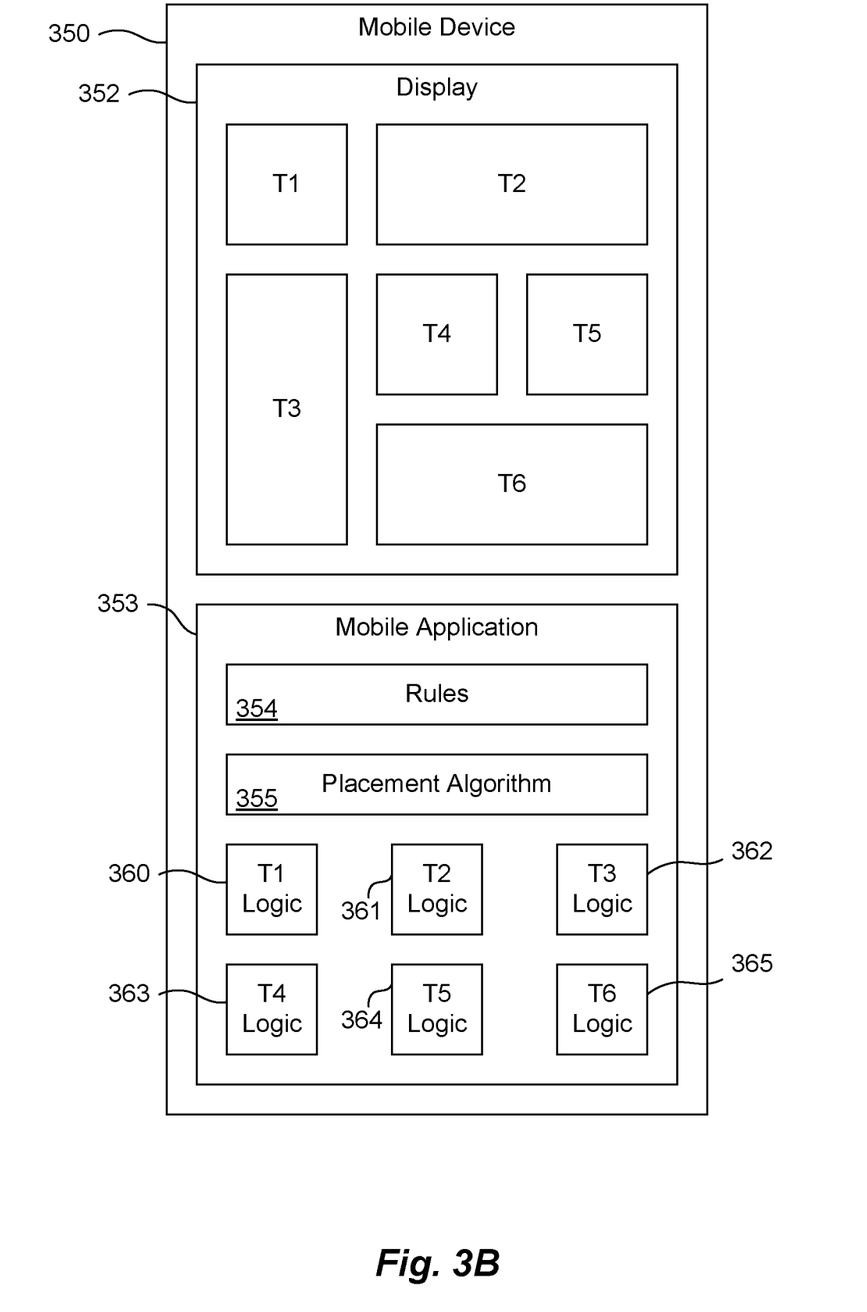
FIG. 3B illustrates a tile framework according to another embodiment.

FIG. 3B illustrates a tile framework according to another embodiment. In this example, mobile application 353 operating on mobile device 350 may display tiles T1-T6 using predefined tile logic 360-365, rules 354, and placement algorithm 355, which may be used to configure the tiles in the display and enhance functionality of the tiles. For instance, as mentioned above, each of tiles T1-T6 may have one or more associated interactive features on a backend system. In one embodiment, each tile may be displayed using a default size that may be based on the particular associated interactive feature for the tile. For instance, a ToDo list tile may have a particular default size of 1×1 and a profile tile may have a default size of 2×2. However, rules 354 may dynamically change the tile size. In one embodiment, rules 354 may change the size of a tile based on whether or not one or more particular other tiles are displayed. In another embodiment, the rules may change the tile size based on a total number of tiles displayed. Other embodiments may use rules that change a default tile size according to other factors or even specify particular placement of certain tiles, which advantageously may give a user more flexibility in arranging a display. The following is an example set of rules that may be used to change the configuration of the tiles in display 352:

```
/*
   1. Preferred Order of Tiles and default sizes:
My Profile - 2x1;
Who's Who - 1x1;
Jam Feed - 1x3;
AutoInsight - 2x1;
To Dos - 1x1;
Jam Group - 1x2;
YouCalc - 1x1;
Time-Off - 1x1;
Jam Notifications - 1x1
   2. Rules for size:
My Profile Tile - Default Size: 2x1
Rule for My Profile Tile size 2x2: no Jam and # of tiles above 5
Jam Feed Tile - Default Size: 1x3
Rule for Jam Feed Tile size 1x2: # of tiles = 8
Rule for Jam Feed Tile size 2x2: no To Do Tile and # of tiles = 6
Special rule when Jam and # of tiles = 5: the feed is going in
2nd place, before ToDo.
*/
```

The above rule set illustrates default sizes and changes in size for 9 tiles used to display and interact with particular backend features. The above example also illustrates that tiles may be displayed in a preferred order. In the above example, a My Profile Tile has a default size of 2x1, but the default size is changed to increase the tile size to 2x2 when a Jam (in this case Jam Feed or Jam Group) Tile is not displayed and when a total number of tiles is above 5. A Jam Feed Tile default size is similarly changed to multiple different sizes based on a total number of tiles, whether or not a particular other tile (e.g., ToDo) is displayed, or a relative position of tiles (e.g., Jam Feed before ToDo). Finally, a special rule designates a particular location of a tile (e.g., Jam Feed in second place).

In one embodiment, tiles may be automatically displayed in a two-dimensional array using a placement algorithm 355. As mentioned above, a preferred sequence (or order) may be specified for the tiles, and the placement algorithm may automatically arrange the tiles on display 352. Since each user may have access to different backend features, it may be advantageous to automatically and dynamically place tiles according to the particular tiles available to each user. Further, the status of some backend features may change. Advantageously, some embodiments may automatically configure the tiles so that there are no blank spaces in the array (e.g., when a feature becomes unavailable). In one embodiment, the placement may include specifying a preferred sequence of the tiles. In the example shown in FIG. 3B, the preferred sequence is specified in rules 354. In one embodiment, placement algorithm 355 performs placement based on the rules 354 (e.g., using the preferred order or modifying the default sizes). Rules may determine the preferred sequence and the tile aspect ratios, for example, which are in turn processed by placement algorithm 355. Placement may further include sequentially determining if a particular tile fits in an available space in the two-dimensional array. The placement algorithm may determine if a tile fits in an available space according to the preferred sequence (e.g., starting with the My Profile Tile above). The algorithm may start with a first row and first column of a grid, and proceed across each row column-by-column until a space can be found. If a tile does fit in an available space, then the tile is displayed in the available space. However, if a tile does not fit in an available space, then the next tile in the preferred sequence that does fit in the available space may be displayed in the available space. One example implementation of a placement algorithm is described below.

FIG. 3B further illustrates tile logic according to another embodiment. In this example, some tiles may include predefined logic customized for interacting with particular backend features. Tiles may be advantageous over generic traditional windows in that the mobile application may include specific logic blocks customized to allow a user to interact with particular backend features using the tiles. Tile T1, for example, may be associated with a particular backend feature. Therefore, tile T1 may include logic 360 customized for the particular backend feature to optimize transactions between the particular backend feature and tile T1. As an example, some tiles may allow users to interact with data records in a backend database, such as a ToDo list, for example. Accordingly, tile logic may retrieve blocks of records and successively present individual data records from the block of records one at a time to be operated on by the user. In one embodiment, features of a backend system are paginated and presented in a tile one at a time. A user may swipe between successive items using a particular tile. For example, data records may be retrieved and stored in a particular order. The records may be presented to a user one at a time, in order, in a tile (e.g., individual items in a ToDo list may be presented according to priority or due date). The tile logic may receive a command from a user (e.g., a swipe across the tile), and the logic may configure each record as an individual page for a tile and display successive individual data records in the tile according to the order. A user may select elements of the data record (e.g., by touching the tile), and the logic may cause further calls to the backend system to be made to access other data or features, for example.

Figure 4:
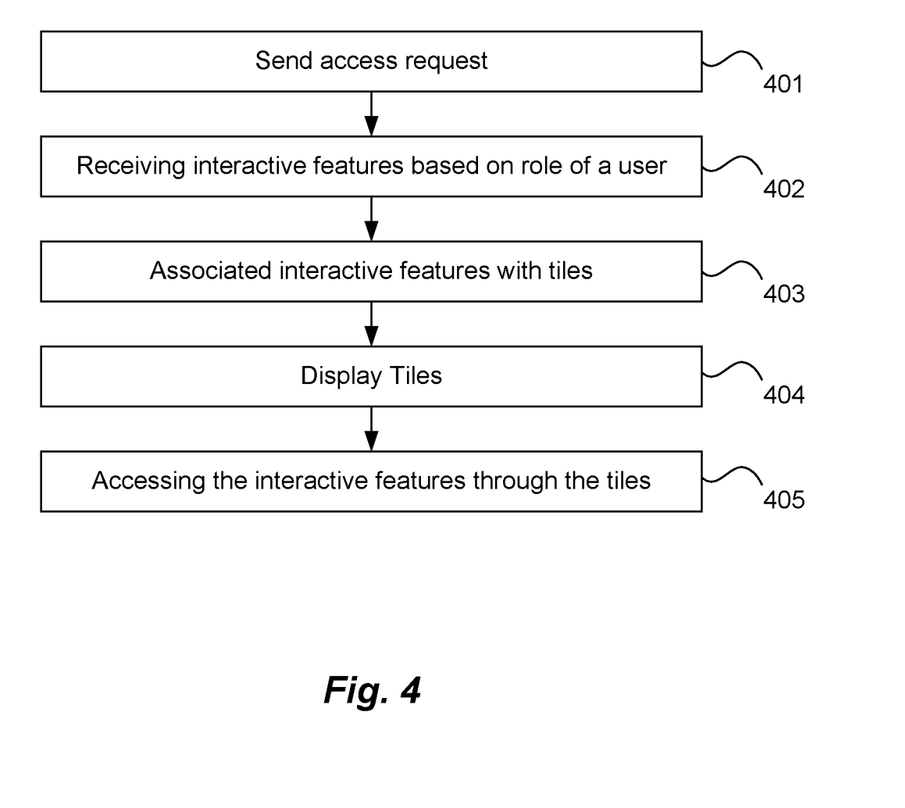
FIG. 4 illustrates a method of displaying tiles according to one embodiment.

FIG. 4 illustrates a method of displaying tiles according to one embodiment. At 401, an access request is sent from a mobile application operating on a mobile device to one or more remote systems. For example, when the mobile application is turned on, or when the mobile application performs a refresh, the mobile application may make a call (e.g., a RestAPI call) to a mobile server. The mobile server may act as a conduit to backend application servers, and may make a RestAPI call to one or more application servers. At 402, interactive features available on the remote systems are received based on a role of a user associated with the mobile application. As mentioned above, permissions may be granted within one or more backend applications based on a user's role, which may be determined when the user's application connects to the backend system. The application servers may expose particular features depending on who the user is within an organization, for example. The exposed features that are provided to a particular user may be compiled into a list, together with an indication of whether a particular feature is enabled or disabled on the backend system. For instance, a mobile application of a particular user having a particular role may receive a list of backend features that the user's role allows them to access. The list may also indicate whether each feature on the list is currently available (e.g., enabled) or unavailable (e.g., disabled).

At 403, the interactive features are associated with tiles. As described above, particular interactive features are associated with particular tiles. In one example embodiment, the list of features received from the backend systems may be filtered. For instance, the mobile application may include a set of predefined features that may be displayed using tiles (e.g., a ToDo list, Events, and Analytics). Thus, the mobile application may iterate through the list and determine which predetermined feature is on the list of enabled features received from the backend systems. For example, the mobile application may specify that a ToDo feature is to be displayed on one of the tiles. Accordingly, the mobile application may search through the list of features from the backend system and determine if a ToDo feature on a backend system is enabled. If so, the tile designated for the ToDo feature is activated.

At 404, the tiles are displayed as a two-dimensional array having rows and columns of tiles. As mentioned above different tiles occupy one or more rows and one or more columns in the two-dimensional array, and tiles may occupy more than one row or more than one column. A detailed example algorithm for placing and displaying tiles of different sizes, including configurations that include at least one tile that occupies multiple rows or columns, is provided below.

At 405, the interactive features are accessed on the remote systems through the associated plurality of tiles.

Figure 5:
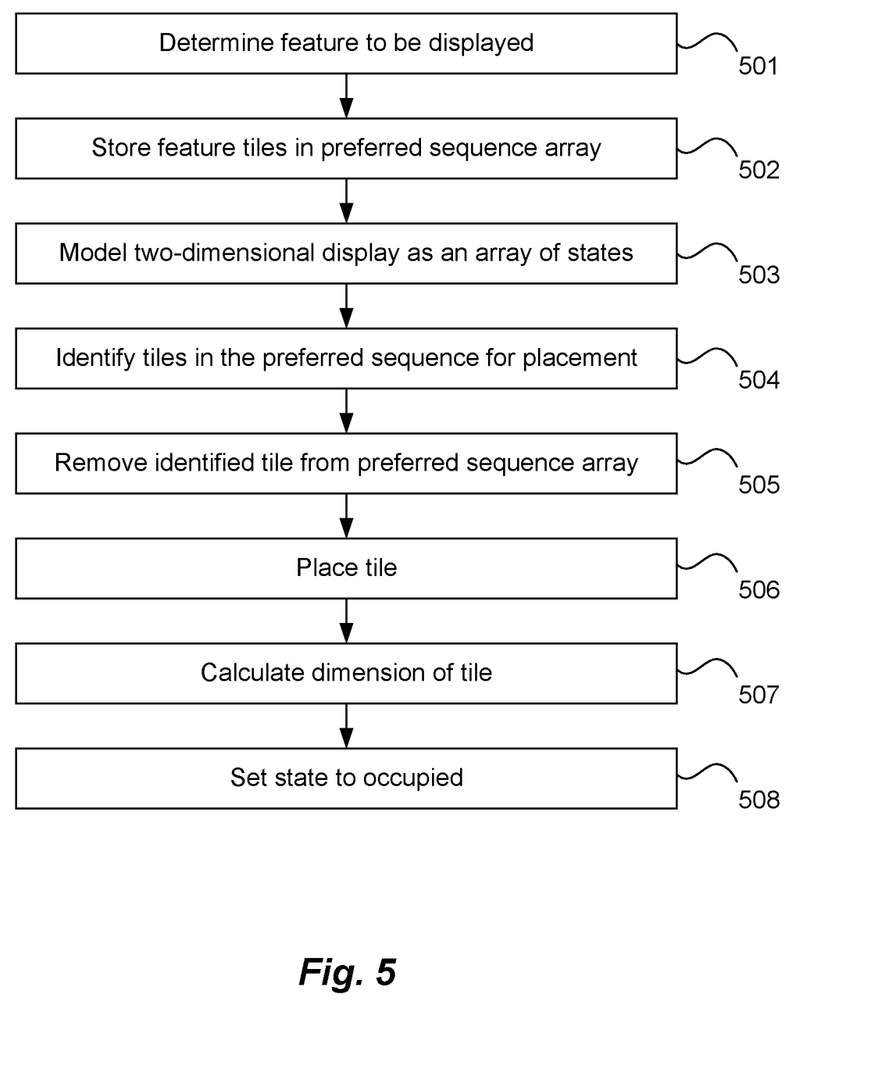
FIG. 5 illustrates one example algorithm for displaying tiles.
Figure 6A:
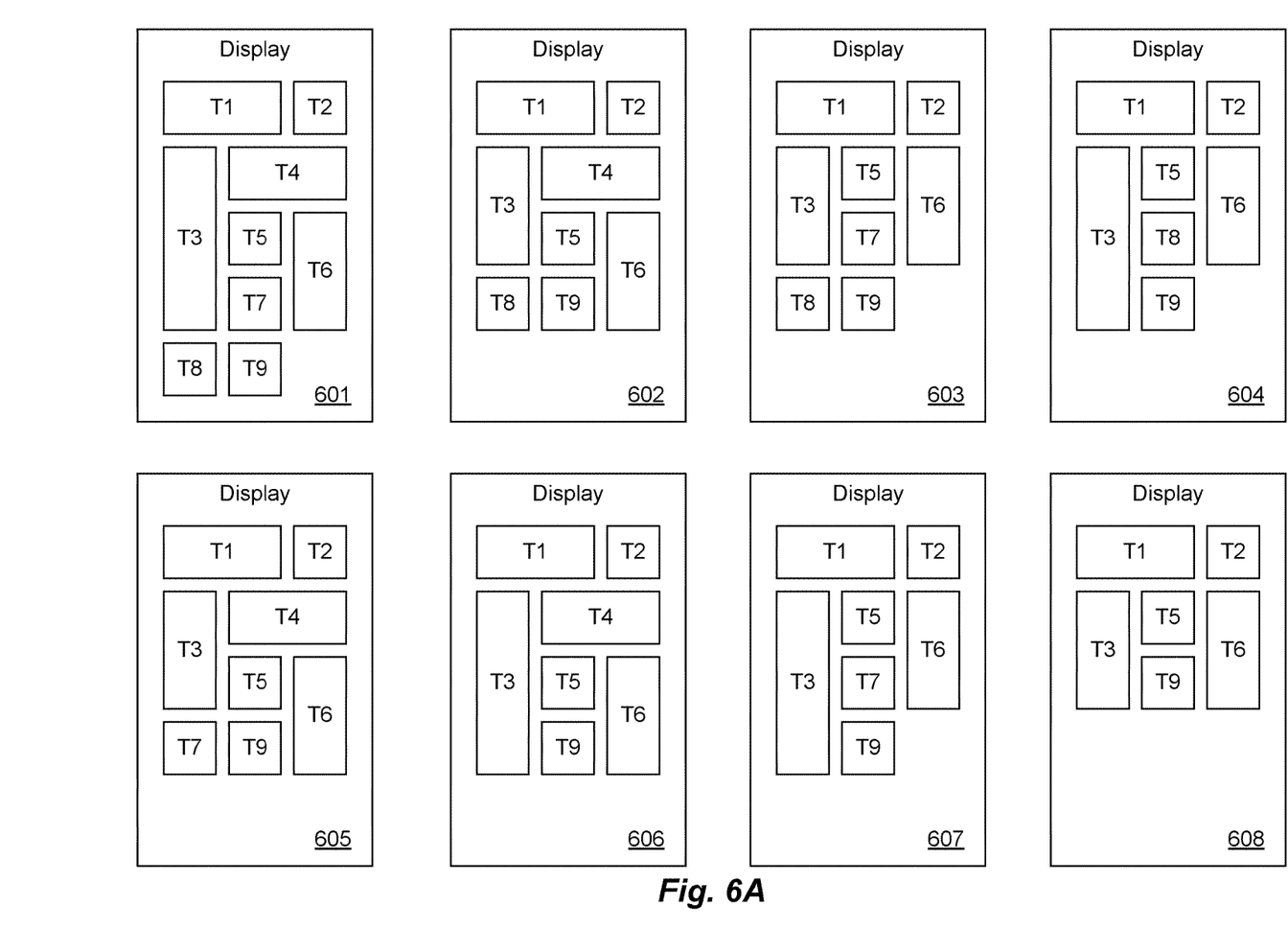
FIGS. 6A-D illustrate an example of automatic tile placement according to another embodiment.
Figure 6B:
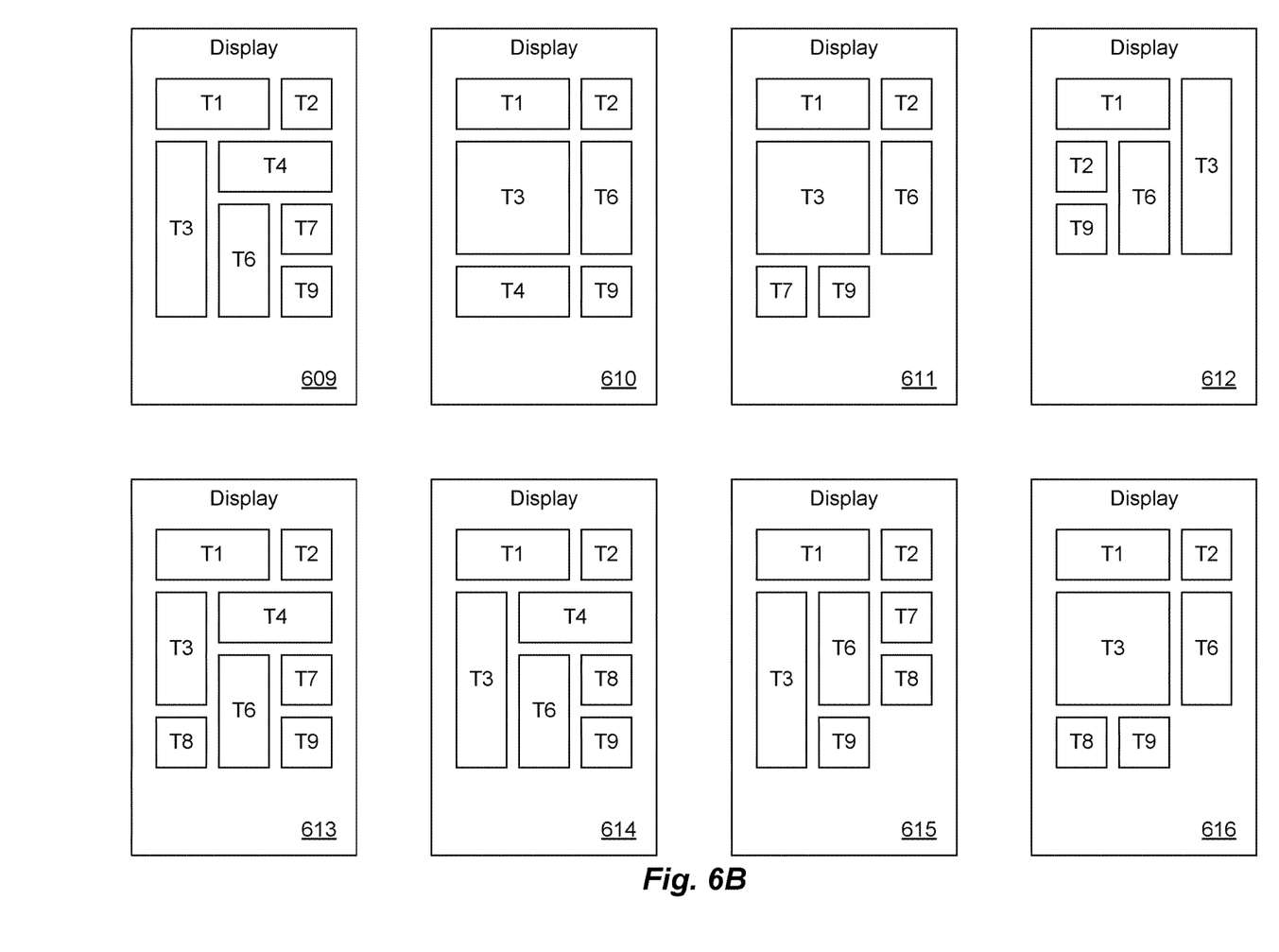
Figure 6C:
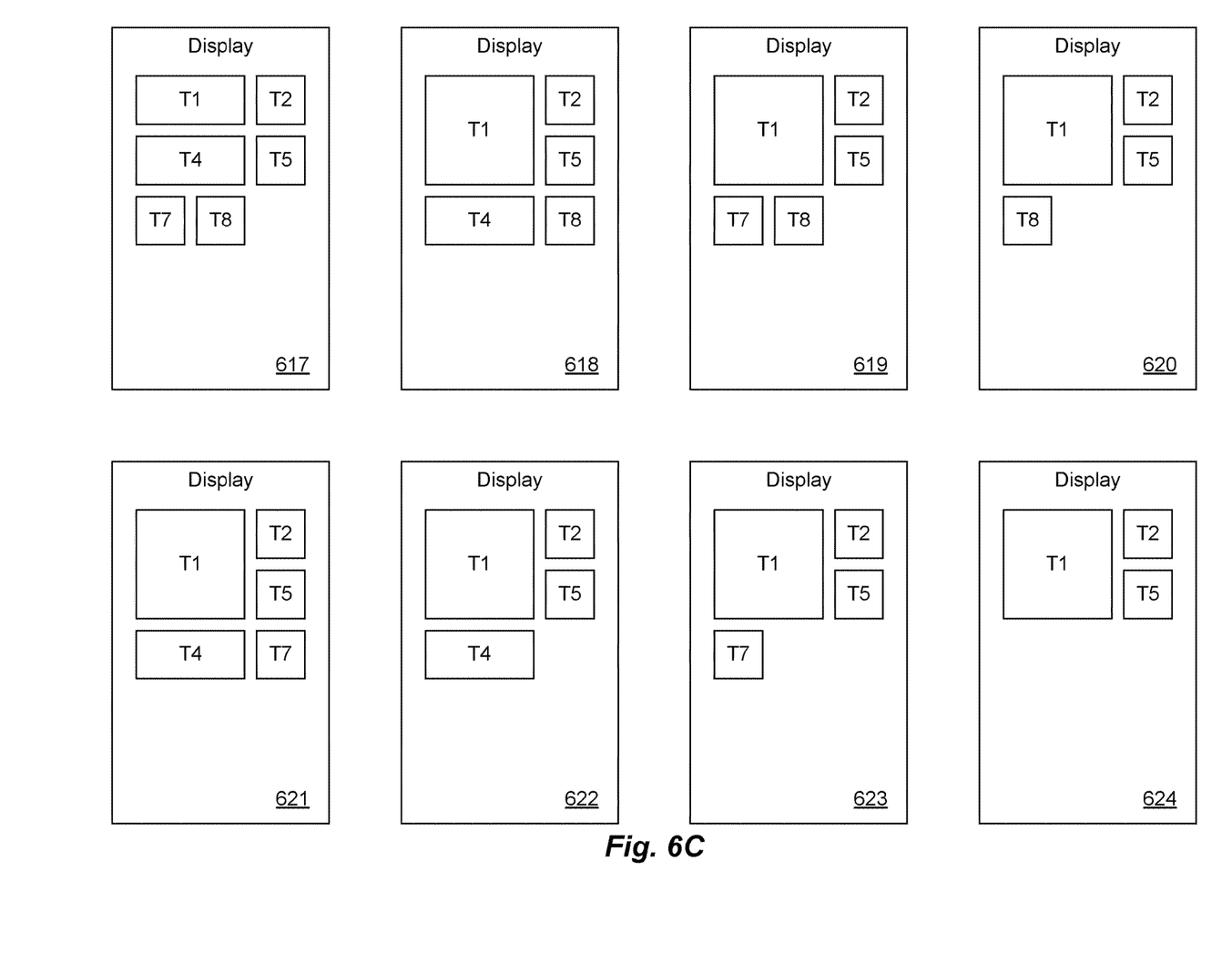
Figure 6D:
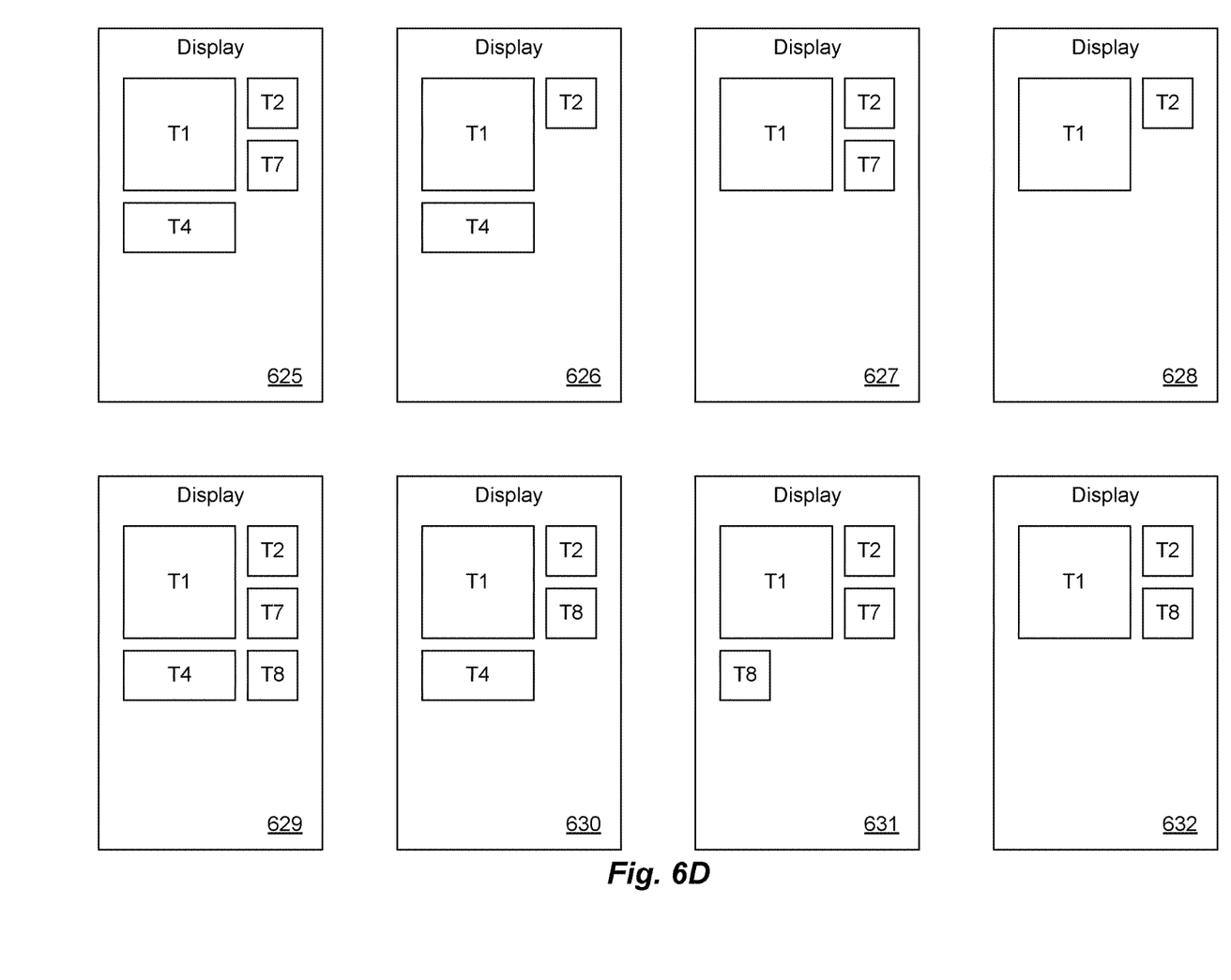
Figure 7:
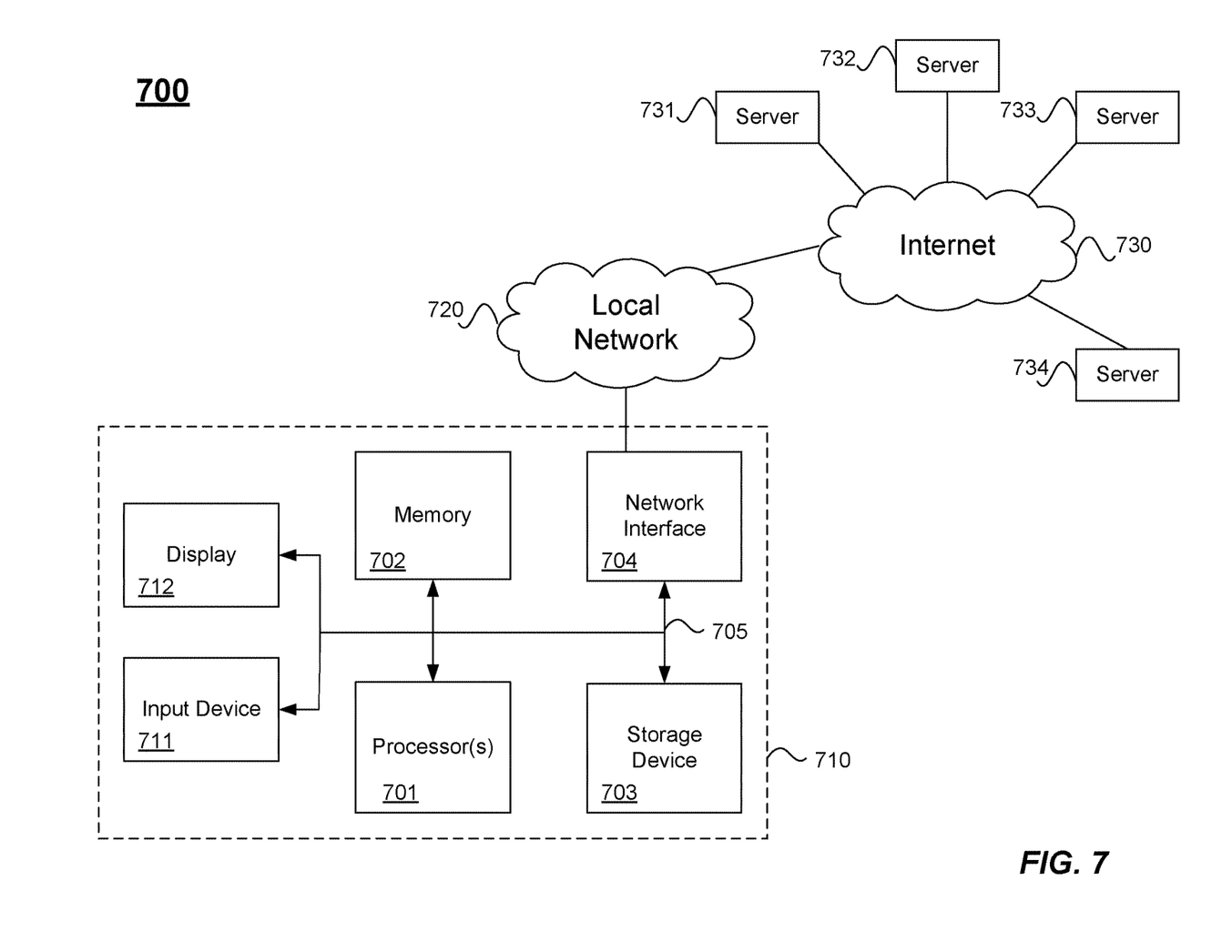
FIG. 7 illustrates hardware of a special purpose computing machine configured with a process according to the above disclosure.

FIG. 5 illustrates one example algorithm for displaying tiles. In this example, dynamically displaying tiles may start at 501 by determining the tiles to be displayed. As mentioned above, either turning on the mobile application or a "pull to refresh" (e.g., by the user) may trigger a backend call to an enterprise server to retrieve all features with their on-off flags (referred to as list A). List A may be filtered by a list of all supported tiles on the mobile application, for example. In this example, only those features that are on the supported tiles list and are turned on are considered to be displayed (referred to as list B). The feature tiles to be displayed (list B) may be compared with a list of feature tiles currently being displayed (referred to as list C). If list B has the same features as list C, then no feature permissions have changed and the current displayed feature tiles would remain. If list B and list C contain different features, then feature permissions have changed on the backend system and the UI displays the feature tiles contained in list B.

The process for laying out tiles in the UI is illustrated at 502-507. This example includes the creation of data structures to store the tiles to be placed and a representation of the two-dimensional array of tiles in the UI. Each tile has an associated feature. Thus, in the following description, the tiles are sometimes referred to as "feature tiles." At 502, the feature tiles to be displayed are stored in an array that is ordered by preferred sequence (a "preferred sequence array"). For purposes of explanation, a specific example is provided using a 3 column UI grid. In other words, the UI is 3 columns wide and the tiles are placed in the UI 3 columns wide and with a number of rows to hold all the tiles. Further, for each tile, the supported aspect ratios in this example are 1×1, 2×1, 2×2, 1×2 and 1×3.

At 503, the display is modeled as a two-dimensional array of states. For example, a two-dimensional array to model the 3 column grid (array B) may be created. Each element of the array represents a row, and each row is another 3-element array (array C) representing a 3-column row. Each element of array C may be initialized with a value to indicate its state as "available". The initialization is carried out across all the elements of array B. The elements of array C found in each of the three elements of array B constitute a 2 dimensional array representing the UI.

At 504, tiles in the preferred sequence are identified for placement. For example, using the two-dimensional array representing rows and columns (arrays B and C), the first row with an empty column may be found and designated row "the current line". The number of columns with an "available" state on "the current line" may be checked. The process may typically start working on the first line with "available" column(s), so if all 3 columns on "the current line" are "available," that means the rows below are all "available." In this case, the first feature tile in the preferred sequence array (array A) is picked because a feature tile of any aspect ratio may be placed in that location. If only the 1st column is "available" on "the current line", then the first feature tile in the preferred sequence array (arrayA) with aspect ratio 1×1 is picked. If only the 2nd column is "available" on "the current line", then the first feature tile in the preferred sequence array (arrayA) with aspect ratio 1×1 is picked. If only the 3rd column is "available" on "the current line", then the first feature tile in the preferred sequence array (arrayA) with aspect ratio 1×1 is picked. If only the 1st and 2nd columns on "the current line" are "available", then the first feature tile in the preferred sequence array (arrayA) with aspect ratio 2×1 is picked. If only the 2nd and 3rd columns on "the current line" are "available", the 1st column on the line below (the next line) may be checked. If that column is "available", a feature tile is placed there in order to avoid it becoming a "blank" tile later. Since column 2 on "the next line" is by implication also empty, and the first feature tile from the preferred sequence array (arrayA) with aspect ratio 2×1 is picked to be placed on "the next line" starting on column 1. If only the 2nd and 3rd columns are "available" on "the current line", but the 1st column on the line below (the next line) is "occupied", then there is no danger of a "left behind blank" tile over that column on "the next line". In this case, columns 2 and 3 are "available" on both the current line and "the next line". Thus, the first feature tile from the preferred sequence array (arrayA) with aspect ratio 2×2 may be found to be placed on both lines in columns 2 and 3. If there is no feature tile with aspect ratio 2×2, the first one that is 2×1 is found to be placed on the current line only in columns 2 and 3. If none of the above logic is able to pick on a feature tile, then just pick the first feature tile in the preferred sequence array (arrayA). This will handle feature tiles of aspect ratios 1×2 and 1×3 because as long as a column is "available" on "the current line", feature tiles with these aspect ratios can be placed.

Once a feature tile is identified by the steps above as one example it may be removed from the preferred sequence array (arrayA) at 505.

At 506, the tile is placed in an available space. In this example, placement may occur as follows. Using the two-dimensional array representing rows and columns (array B), the first row with an empty column is found and called "the current line". Each tile may have an aspect ratio width, W, and aspect ratio height, H, of an aspect ratio W×H. If the width of the feature tile is 1, then the tile is place there and the "available" column becomes the x-coordinate and the row number of "the current line" is the y-coordinate for the tile. If the width of the feature tile is 2, but the "available" column is the 3rd column, this column cannot be used as the x-coordinate because the tile requires two columns. Rather, "the next line" is considered instead to place the feature tile. In "the next line", if the "available" column is the 1st or 2nd column, the next column is checked to make sure it is also "available". If so, the feature tile may be placed here, with the first "available" column as the x-coordinate and the row number of "the current line" is the y-coordinate.

At 507, the dimensions of the tile may be calculated. For example, at this point, the coordinates are expressed in terms of row and column numbers. To place the feature tile on the UI, the tile is converted to pixels. Rows and columns may be numbered starting from 0, and tile coordinates may be referenced from the upper left corner of the tile, for example. By multiplying the column number x-coordinate and the tile pixel width (a constant, e.g., 100 pixels), we get the actual x-coordinate in pixels (e.g., the second column is calculated as: 1×(100 pixels/col); x-coordinate=100 pixels). By multiplying the row number y-coordinate and the tile pixel height (a constant, e.g., 100 pixels), we get the actual y-coordinate in pixels (e.g., the third row is calculated as: 2×(100 pixels/row); y-coordinate=200 pixels). By multiplying the aspect width and the tile width (a constant), we get the actual width of the feature tile in pixels (e.g., a pixel with a width of 2 columns will be 200 pixels wide). By multiplying the aspect height and the tile height (a constant), we get the actual height of the feature tile in pixels (e.g., a pixel with a height of 1 row will be 100 pixels high). With the actual coordinates and dimension (width and height) of the feature tile in pixels, we can exactly define the boundary and frame of the feature tile and place it on the UI.

At 508, the state of the location(s) where the tile was placed are changed from "available" to "occupied." To do that, the elements in the two-dimensional array representing rows (array B elements) and columns (array C elements) that correspond to the now "occupied" grids are identified and their values are set to "occupied". The row number y-coordinate that was used above identifies the element in arrayB. In arrayB each element represents a row and is in turn a 3-element array representing the 3 columns (array C). Further, the column number x-coordinate can identify which array C element should be marked as "occupied". If the aspect width is 2, then the next element in array C is also marked to be "occupied". If aspect height is 2, the same is done for "the next line". If aspect height is 3, the same is done again for the next "next line".

FIGS. 6A-D illustrate an example of automatic tile placement according to another embodiment. As mentioned above, different users may have access to different backend interactive features and associated tiles based on their roles. Displays 601-632 show different tile configurations for tiles T1-T9 for different roles making different backend features accessible on a mobile application. Tiles T1-T9 have associated backend features. Table 1 below illustrates how different tiles T1-T9 are displayed based on a person's role. When a particular user's role allows the user permission to access a particular backend feature, the feature is extended to the mobile device and displayed in one of the tiles. In Table 1, an "X" indicates that the backend feature and tile are active and shown in a display, and an empty cell indicates that the backend feature and tile are inactive and not shown in a display. Tiles may be automatically reconfigured in displays 601-632 based on whether or not the corresponding backend features are active using the algorithm described above, for example.

|     | T1, T2 | T3, T6, T9 | T5 | T8 | T4 | T7 |
|-----|--------|------------|----|----|----|----|
| 601 | X      | X          | X  | X  | X  | X  |
| 602 | X      | X          | X  | X  | X  |    |
| 603 | X      | X          | X  | X  |    | X  |
| 604 | X      | X          | X  | X  |    |    |
| 605 | X      | X          | X  |    | X  | X  |
| 606 | X      | X          | X  |    | X  |    |
| 607 | X      | X          | X  |    |    | X  |
| 608 | X      | X          | X  |    |    |    |
| 609 | X      | X          |    | X  | X  | X  |
| 610 | X      | X          |    | X  | X  |    |
| 611 | X      | X          |    | X  |    | X  |
| 612 | X      | X          |    | X  |    |    |
| 613 | X      | X          |    |    | X  | X  |
| 614 | X      | X          |    |    | X  |    |
| 615 | X      | X          |    |    |    | X  |
| 616 | X      | X          |    |    |    |    |
| 617 | X      |            | X  | X  | X  | X  |
| 618 | X      |            | X  | X  | X  |    |
| 619 | X      |            | X  | X  |    | X  |
| 620 | X      |            | X  | X  |    |    |
| 621 | X      |            | X  |    | X  | X  |
| 622 | X      |            | X  |    | X  |    |
| 623 | X      |            | X  |    |    | X  |
| 624 | X      |            | X  |    |    |    |
| 625 | X      |            |    | X  | X  | X  |
| 626 | X      |            |    | X  | X  |    |
| 627 | X      |            |    | X  |    | X  |
| 628 | X      |            |    | X  |    |    |
| 629 | X      |            |    |    | X  | X  |
| 630 | X      |            |    |    | X  |    |
| 631 | X      |            |    |    |    | X  |
| 632 | X      |            |    |    |    |    |

Example Hardware

FIG. 5 illustrates hardware of a special purpose computing machine configured with a process according to the above disclosure. The following hardware description is merely one example. It is to be understood that a variety of computers topologies may be used to implement the above described techniques. An example mobile computer system 510 is illustrated in FIG. 5. Mobile computer system 510 includes a bus 505 or other communication mechanism for communicating information, and one or more processor(s) 501 coupled with bus 505 for processing information. Mobile computer system 510 also includes a memory 502 coupled to bus 505 for storing information and instructions to be executed by processor 501, including information and instructions for performing the techniques described above, for example. This memory may also be used for storing variables or other intermediate information during execution of instructions to be executed by processor 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 503 may include source code, binary code, or software files for performing the techniques above, for example. Storage device and memory are both examples of non-transitory computer readable storage mediums.

Mobile computer system 510 may be coupled via bus 505 to a display 512 for displaying information to a computer user. An input device 511 such as a keyboard, touchscreen, and/or mouse is coupled to bus 505 for communicating information and command selections from the user to processor 501. The combination of these components allows the user to communicate with the system. In some systems, bus 505 represents multiple specialized buses, for example.

Mobile computer system 510 also includes a network interface 504 coupled with bus 505. Network interface 504 may provide two-way data communication between computer system 510 and a local network 520. The network interface 504 may be a wireless or wired connection, for example. Mobile computer system 510 can send and receive information through the network interface 504 across a local area network, an Intranet, a cellular network, or the Internet, for example. One example implementation may include a mobile application executing on a mobile computing system 510 that displays tiles used to interact with remote systems as described above. In the Internet example, a mobile application may access data and features on backend systems that may reside on multiple different hardware servers 531-535 across the network. Servers 531-535 may also reside in a cloud computing environment, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method of accessing interactive features over a mobile device comprising:
   sending an access request from a mobile application operating on the mobile device to one or more enterprise software applications;
   receiving, by the mobile device, a plurality of interactive features available on the one or more enterprise software applications;
   associating, by the mobile device, the plurality interactive features with a plurality of tiles supported by the mobile application;
   displaying the tiles associated with the plurality of interactive features, wherein the plurality of interactive features on the one or more enterprise software applications are accessed through the associated plurality of tiles;
   receiving, by the mobile device, a first list of interactive features on the one or more enterprise software applications and, for each interactive feature, an on-off flag indicating whether a particular interactive feature is turned on or turned off on the one or more enterprise software applications;
   filtering, by the mobile device, the first list of interactive features using a list of all supported tiles on the mobile application to produce a second list of interactive features that are both turned on and included in the list of supported tiles on the mobile application; and
   comparing, by the mobile device, the second list of interactive features with a third list of interactive features currently being displayed in currently displayed tiles, wherein if the second list and the third list are the same, then currently displayed tiles remain displayed, and wherein if the second list is different than the third list, then the mobile device displays tiles on the second list.

2. The method of claim 1 wherein the tiles associated with the plurality of interactive features are displayed as a two-dimensional array having rows and columns of tiles.

3. The method of claim 1 wherein a first tile is associated with a particular interactive feature provided by a plurality of different application servers.

4. The method of claim 1 wherein a first tile is associated with interactive features comprising core functionality of an application server.

5. The method of claim 1 wherein a first tile is associated with at least one interactive feature from a first application server and a second tile is associated with at least one interactive feature from a second application server.

6. The method of claim 1 wherein one or more tiles comprise custom logic corresponding to one or more particular interactive features.

7. The method of claim 6 wherein at least one tile comprises custom logic for successively presenting individual data records from a block of records in a tile, wherein the data records are arranged in an order, and wherein, in response to a command from a user, the logic displays successive individual data records as pages in a particular tile according to said order.

8. A mobile device comprising:
   a processor; and
   a non-transitory computer readable medium having stored thereon one or more programs, which when executed by the processor, causes the processor to:
   send an access request from a mobile application operating on the mobile device to one or more enterprise software applications;
   receive a plurality of interactive features available on the one or more enterprise software applications;
   associate the plurality interactive features with a plurality of tiles supported by the mobile application;
   display the tiles associated with the plurality of interactive features, wherein the plurality of interactive features on the one or more enterprise software applications are accessed through the associated plurality of tiles;
   receive a first list of interactive features on the one or more enterprise software applications and, for each interactive feature, an on-off flag indicating whether a particular interactive feature is turned on or turned off on the one or more enterprise software applications;
   filter the first list of interactive features using a list of all supported tiles on the mobile application to produce a second list of interactive features that are both turned on and included in the list of supported tiles on the mobile application; and
   compare the second list of interactive features with a third list of interactive features currently being displayed in currently displayed tiles, wherein if the second list and the third list are the same, then currently displayed tiles remain displayed, and wherein if the second list is different than the third list, then the mobile device displays tiles on the second list.

9. The mobile device of claim 8 wherein a first tile is associated with a particular interactive feature provided by a plurality of different application servers.

10. The mobile device of claim 8 wherein a first tile is associated with interactive features comprising core functionality of an application server.

11. The mobile device of claim 8 wherein a first tile is associated with at least one interactive feature from a first application server and a second tile is associated with at least one interactive feature from a second application server.

12. The mobile device of claim 8 wherein one or more tiles comprise custom logic corresponding to one or more particular interactive features.

13. The mobile device of claim 12 wherein at least one tile comprises custom logic for successively presenting individual data records from a block of records in a tile, wherein the data records are arranged in an order, and wherein, in response to a command from a user, the logic displays successive individual data records as pages in a particular tile according to said order.

14. A non-transitory computer readable storage medium storing one or more programs, the one or more programs comprising instructions for:
   sending an access request from a mobile application operating on a mobile device to one or more enterprise software applications;
   receiving, by the mobile device, a plurality of interactive features available on the one or more enterprise software applications;
   associating, by the mobile device, the plurality interactive features with a plurality of tiles supported by the mobile application;
   displaying the tiles associated with the plurality of interactive, wherein the plurality of interactive features on the one or more enterprise software applications are accessed through the associated plurality of tiles;
   receiving, by the mobile device, a first list of interactive features on the one or more enterprise software applications and, for each interactive feature, an on-off flag indicating whether a particular interactive feature is turned on or turned off on the one or more enterprise software applications;
   filtering, by the mobile device, the first list of interactive features using a list of all supported tiles on the mobile application to produce a second list of interactive features that are both turned on and included in the list of supported tiles on the mobile application; and
   comparing, by the mobile device, the second list of interactive features with a third list of interactive features currently being displayed in currently displayed tiles, wherein if the second list and the third list are the same, then currently displayed tiles remain displayed, and wherein if the second list is different than the third list, then the mobile device displays tiles on the second list.

15. The non-transitory computer readable storage medium of claim 14 wherein the tiles associated with the plurality of interactive features are displayed as a two-dimensional array having rows and columns of tiles.

16. The non-transitory computer readable storage medium of claim 14 wherein a first tile is associated with a particular interactive feature provided by a plurality of different application servers.

17. The non-transitory computer readable storage medium of claim 14 wherein a first tile is associated with interactive features comprising core functionality of an application server.

18. The non-transitory computer readable storage medium of claim 14 wherein a first tile is associated with at least one interactive feature from a first application server and a second tile is associated with at least one interactive feature from a second application server.

19. The non-transitory computer readable storage medium of claim 14 wherein one or more tiles comprise custom logic corresponding to one or more particular interactive features.

20. The non-transitory computer readable storage medium of claim 19 wherein at least one tile comprises custom logic for successively presenting individual data records from a block of records in a tile, wherein the data records are arranged in an order, and wherein, in response to a command from a user, the logic displays successive individual data records as pages in a particular tile according to said order.

* * * * *